US006889364B2

(12) United States Patent
Camara et al.

(10) Patent No.: US 6,889,364 B2
(45) Date of Patent: May 3, 2005

(54) COMPUTER-IMPLEMENTED IMAGE ACQUISITION SYSTEM

(75) Inventors: Franc J. Camara, Redmond, WA (US); Richard S. Turner, Jr., Woodinville, WA (US); Mark R. Enstrom, Redmond, WA (US); Reed K. Bement, Kirkland, WA (US); Andrew S. Ivory, Woodinville, WA (US)

(73) Assignee: Microsoft Corporation, Redmond, WA (US)

( * ) Notice: Subject to any disclaimer, the term of this patent is extended or adjusted under 35 U.S.C. 154(b) by 124 days.

(21) Appl. No.: 10/087,257

(22) Filed: Oct. 19, 2001

(65) Prior Publication Data

US 2002/0122071 A1 Sep. 5, 2002

Related U.S. Application Data

(62) Division of application No. 09/153,432, filed on Sep. 14, 1998, now Pat. No. 6,373,507.

(51) Int. Cl.$^7$ ................................................ G06F 3/00
(52) U.S. Cl. ...................... 715/771; 715/772; 715/970; 715/527; 358/474; 382/312
(58) Field of Search ................................. 345/716, 764, 345/771, 778, 810–813, 825, 835, 846, 902, 970; 358/403, 442, 474; 382/312; 707/3; 715/500.1, 527

(56) References Cited

U.S. PATENT DOCUMENTS

| | | | |
|---|---|---|---|
| 4,837,635 A | 6/1989 | Santos | 358/401 |
| 5,191,645 A | 3/1993 | Carlucci et al. | 345/723 |
| 5,385,475 A | 1/1995 | Sudman et al. | 434/307 R |
| 5,412,773 A | 5/1995 | Carlucci et al. | 345/723 |
| 5,630,079 A | 5/1997 | McLaughlin | |
| 5,652,849 A | 7/1997 | Conway et al. | |
| 5,657,461 A | 8/1997 | Harkins et al. | |
| 5,706,457 A | 1/1998 | Dwyer et al. | 345/835 |
| 5,796,945 A | 8/1998 | Tarabella | 709/219 |
| 5,949,411 A | 9/1999 | Doerr et al. | 345/716 |
| 6,028,604 A | 2/2000 | Matthews, III et al. | 345/821 |
| 6,097,389 A | 8/2000 | Morris et al. | 345/804 |
| 6,118,546 A | 9/2000 | Sanchez et al. | 358/1.6 |
| 6,239,882 B1 * | 5/2001 | De Mangelaere et al. | 358/474 |
| 6,249,361 B1 * | 6/2001 | Tahara | 358/474 |
| 6,288,716 B1 | 9/2001 | Humpleman et al. | |
| 6,425,001 B2 | 7/2002 | Lo et al. | |
| 6,463,426 B1 | 10/2002 | Lipson et al. | |
| 6,486,976 B1 * | 11/2002 | Nakamura et al. | 358/474 |
| 6,504,571 B1 | 1/2003 | Narayanaswami et al. | |
| 6,587,129 B1 | 7/2003 | Lavendel et al. | |

OTHER PUBLICATIONS

"Microsoft Media Manager Overview"—Informedia—Internet References. HTTP://www.asia.microsoft.com/mediamanager, Apr. 1997.
"Host System and Attached Non–Programmable Terminal with Open Parallel Port ," IBM Technical Disclosure Bulletin, vol. 38 No. 09, Sep. 1995, pp. 475–478.

* cited by examiner

Primary Examiner—X. L. Bautista
(74) Attorney, Agent, or Firm—Lee & Hayes, PLLC

(57) ABSTRACT

An image acquisition system has a computer and one or more imaging devices coupled thereto. Each imaging device has a device memory and is capable of capturing and storing a digital image in its memory. An image device manager is implemented in software on the computer to control imaging device operation. The image device manager presents a user interface (UI) within the familiar graphical windowing environment. The UI has a context space to a particular imaging context (e.g., scanning, photography, and video). The UI also has a persistently-visible imaging menu positioned within the context space that lists options particular to the imaging context. The image acquisition system also includes a set of application program interfaces (APIs) that enable applications to manage loading and unloading of imaging devices, monitor device events, query device information properties, create device objects, capture images using the devices, and store or manipulate the captured images.

36 Claims, 7 Drawing Sheets

COMPUTER-IMPLEMENTED IMAGE ACQUISITION SYSTEM

RELATED APPLICATIONS

This is a divisional of U.S. patent application Ser. No. 09/153,432, filed Sep. 14, 1998, entitled "Computer-implemented image acquisition system" and listing Camara et al. as inventors, which is now U.S. Pat. No. 6,373,507.

TECHNICAL FIELD

This invention relates to computer-implemented systems for managing imaging devices, such as digital cameras, scanners, and the like. This invention also relates to graphical window user interfaces, and particularly to user interfaces used to facilitate capture and storage management of digital images. This invention if further relates to operating systems and browsers that incorporate image device managers and user interfaces.

BACKGROUND

Digital imaging devices, such as scanners, cameras, video cameras, have been experiencing rapid growth in popularity as their price tags continue to decrease. Recreational photographers enjoy capturing pictures and videos and placing the digital files onto their computers for printing or emailing to friends and relatives. Businesses use scanners to digitally record documents used in day-to-day operation for archival purposes.

Other solutions to this problem already exist. For example, TWAIN and ISIS are two image acquisition systems that are available today. However, both of these solutions have problems. TWAIN lacks robustness and interoperability. ISIS is a proprietary design that renders it difficult to use with other applications.

Accordingly, a task set before the inventor was to create an image acquisition system that was based on an open architecture model and could be integrated with existing applications and operating systems to provide a convenient environment for the user.

SUMMARY

This invention concerns an image acquisition system that offers an open architecture to integration with existing operating systems and other applications.

In an exemplary implementation, the image acquisition system is implemented on computer, such as a desktop personal computer, having a processing, unit, memory, and operating system. One or more imaging devices are coupled to the computer. Examples of the imaging devices include a scanner, a digital camera, a digital video camera, and so forth. Some imaging devices, such as digital cameras, have a device memory and are capable of capturing a digital image and storing the image on its memory. Other imaging devices, such as scanners, may not have their own device memory.

The image acquisition system further includes an image device manager that is implemented in software on the computer to control operation of the imaging devices. The image acquisition system presents a user interface (UI) within the familiar graphical windowing environment. The UI presents a graphical window having a context space that pertains to a particular imaging context (e.g., scanning, photography, and video). In the camera context, the is context space presents image files stored on the camera memory and/or on the computer memory. In the scanner context, the context space includes a preview scan area that reveals a preview of the image in the scanner. In the video context, the context space presents video clips stored on the computer memory, but logically represented as belonging to the video camera.

The UI also has a persistently visible imaging menu positioned within the context space that lists options particular to an imaging context. For example, if the context space pertains to the camera context, the menu lists options to take a picture, store a captured image on the computer, send the image in an email, and so on. In the scanner context, the menu lists options to select an image type, review an image, send the image to a particular destination, and scan the image.

The image acquisition system also includes a set of application program interfaces, (APIs) that expose image management functionality to applications. The APIs enable applications to manage loading and unloading of imaging devices, monitor device events, query device information properties, create device objects, capture images using the devices, and store or manipulate the images after their capture.

DETAILED DESCRIPTION

This invention concerns a computer-implemented image acquisition system that manages imaging devices (such as digital cameras, scanners, digital video cameras, and the like) and the images captured by them. In a preferred implementation, the image acquisition system is implemented in a general-purpose computer (e.g., personal computer, laptop, etc.) to manage imaging devices a attached locally to the computer or coupled remotely via a network. The image acquisition system supports a graphical user interface windowing environment that integrates image device management with the same look and feel of familiar browsing user interfaces for conventional file systems. In this manner, a user encounters a familiar experience when managing the imaging devices and image files from his/her computer.

Exemplary System Architecture

Figure 1:
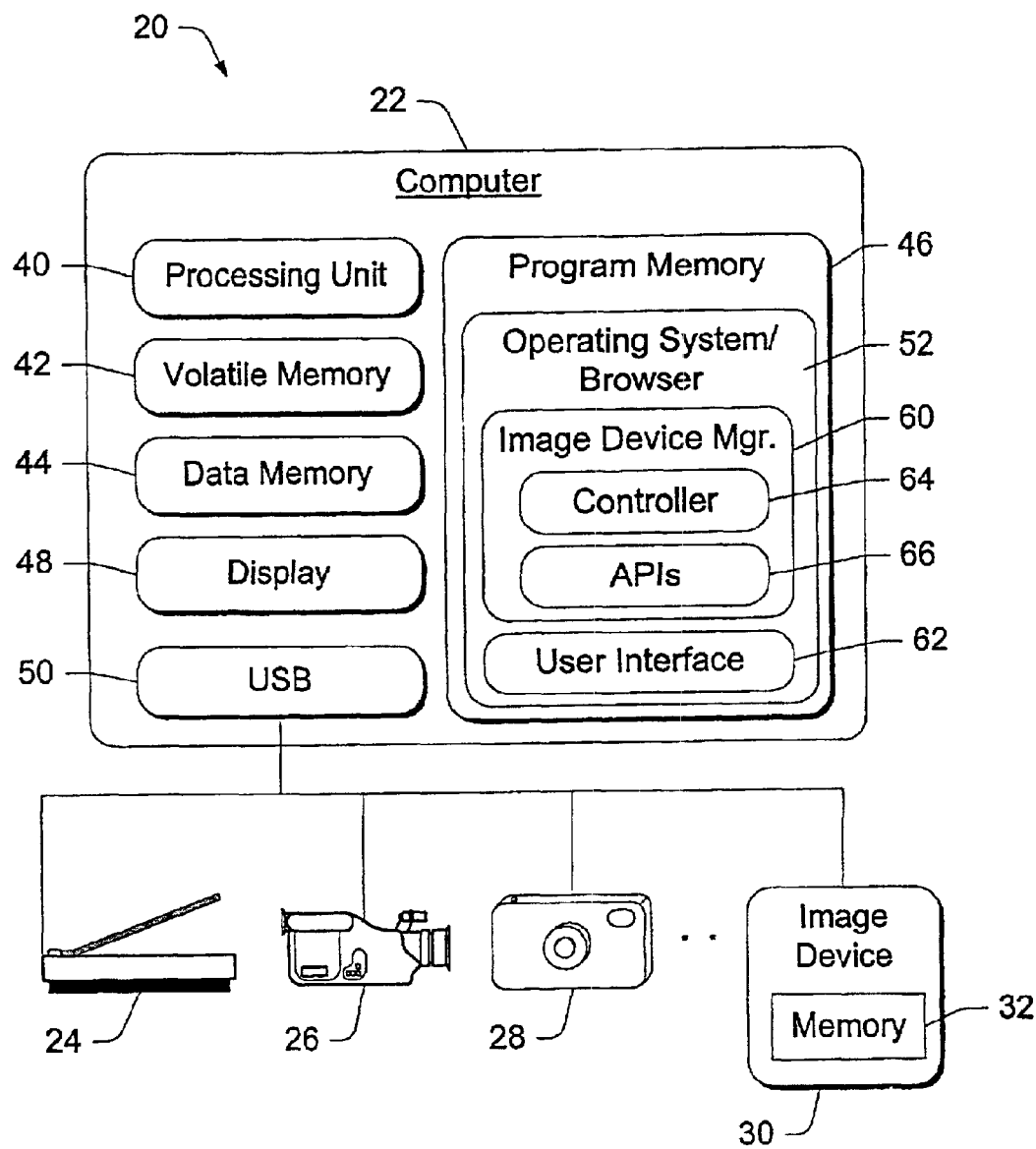
FIG. 1 is a block diagram of an image acquisition system.

FIG. 1 shows an image acquisition system 20 having a computer 22 coupled to multiple imaging devices 24–30. The computer 22 is a general-purpose computing device that is described and illustrated, for discussion purposes, as a desktop personal computer (PC). The computer 22 has a processing unit 40, a volatile memory 42 (e.g., RAM), a non-volatile data memory 44 (e.g., disk drive, etc.), a non-volatile program memory 46 (e.g., ROM, disk drive, CD-ROM, etc.), a display 48 (e.g., VGA monitor), and a universal serial bus (USB) 50. An operating system/browser 52 is stored in program memory 46 and executed on the processing unit 40 when the computer is booted. Examples of suitable operating systems 52 include the Windows-brand operating systems from Microsoft Corporation and the operating systems from Apple Computer. Although a USB 50 is shown and described, other bus architectures may be used, including general serial buses, a SCSI bus, an IEEE 1394 serial bus that conforms to the IEEE 1394 specification, and so forth.

The imaging devices 24–30 are coupled to the computer via a serial connection to the USB 50. Illustrated examples of the imaging devices include a scanner 24, a video camera 26, and a digital camera 28. However, other imaging devices (e.g., copiers, facsimile machines, etc.) may also be used in conjunction with aspects of this invention, as represented by the generic imaging device 30. Some of the imaging devices have their own memory, as represented by memory 32 in imaging device 30. For example, the digital camera may have its own memory, whereas the scanner typically does not have a memory.

The image acquisition system 20 includes an image device manager 60, which is implemented as a software component loaded on the computer 22. More particularly, the image device manager 60 is stored in program memory 46 and runs on processing unit 40 during execution. The image device manager 60 may be integrated into the operating system 52 (as shown), executed as a set of services, or implemented as a separate self-contained program.

The image acquisition system 20 also has a user interface 62, which is preferably a graphical user interface that presents a graphical window having a context space pertaining to the imaging context. Depending upon the particular context, the context space may list available imaging devices for which device drivers have been loaded onto the computer, or list digital image files captured by one or more of the imaging devices, or show an image being scanned in by the scanner.

The user interface 62 further presents a persistently visible imaging menu positioned within the context space. The imaging menu lists options that are particular to controlling the various imaging devices. For instance, when the context space pertains to the camera context, the menu lists a "Take Picture" option that is specific to operating the digital camera 28. Upon user selection of "Take Picture", the image device manager 60 directs the digital camera 28 to record the current image obtained through the camera lens. In the scanner context, the menu lists a "Scan/Open" option that is particular to operating the scanner. Upon selection of this option, the image device manager 60 directs the scanner to scan the current image.

The image device manager 60 has an image device driver 64 and a set of APIs (application program interfaces) 66. The image device driver 64 controls operation, of the imaging device in response to selected options in the context-specific menu. The driver 64 is the code that facilitates communication with the imaging device over the USB 50 and passes commands to capture an image, to read image files from the device's local memory, to obtain the device's properties, and so forth.

The APIs 66 define a set of interfaces that can be used to access the functionality of the image device manager 60. These APIs are described below in a section entitled "Image Acquisition API".

Exemplary Software Architecture

Figure 2:
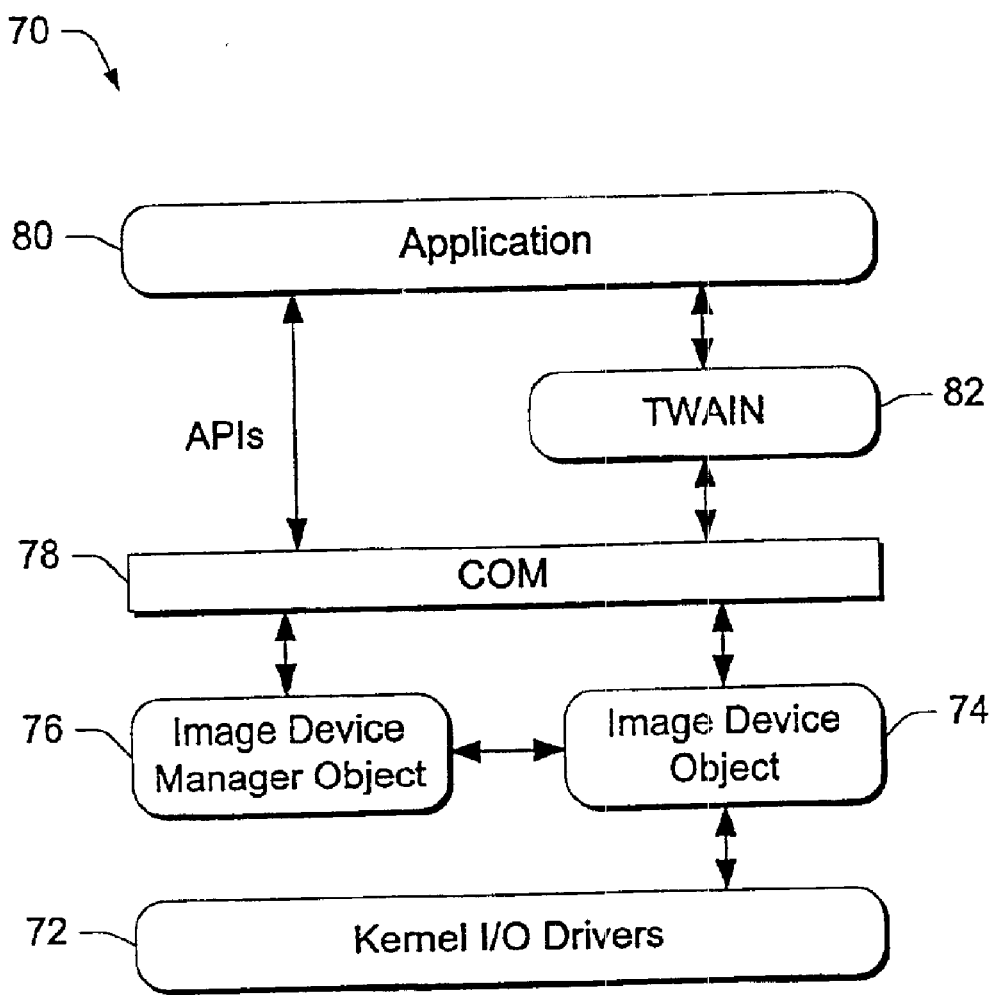
FIG. 2 is a block diagram of a software architecture for the image acquisition system.

FIG. 2 shows a software architecture 70 for implementing the image acquisition system. At the kernel level, the architecture 70 includes kernel I/O drivers 72 that include a bus driver to drive serial communication with the imaging device over the USB 50.

At the user level, a device driver 74 is loaded for the particular imaging device connected to the computer. The device driver 74 includes a device object, an optional UI, and optional image processing capabilities. An image device manager object 76 is called to initialize and select an image device, and create the device interface. The image device manager object 76 performs such tasks as instantiating a device driver object 74, determining the device status, monitoring events from the device, and so forth.

A COM (component object model) layer 78 exposes the device driver object 74 and image device manager object 76 to an upper level application 80. The application layer 80 represents both traditional TWAIN based applications that utilize a TWAIN compatibility layer 82, as well as new applications that support the APIs 66. Unlike the traditional TWAIN model, however, the TWAIN compatibility layer 82 interacts with the COM-based objects 74 and 76 rather than TWAIN-based devices.

Image Acquisition User Interface

The image acquisition system may be incorporated into the operating system, exist as a set of services, or be run as a separate, self-contained application. For discussion purposes, the image acquisition system is described as being integrated into an operating system that supports a graphical user interface windowing environment.

Figure 3:
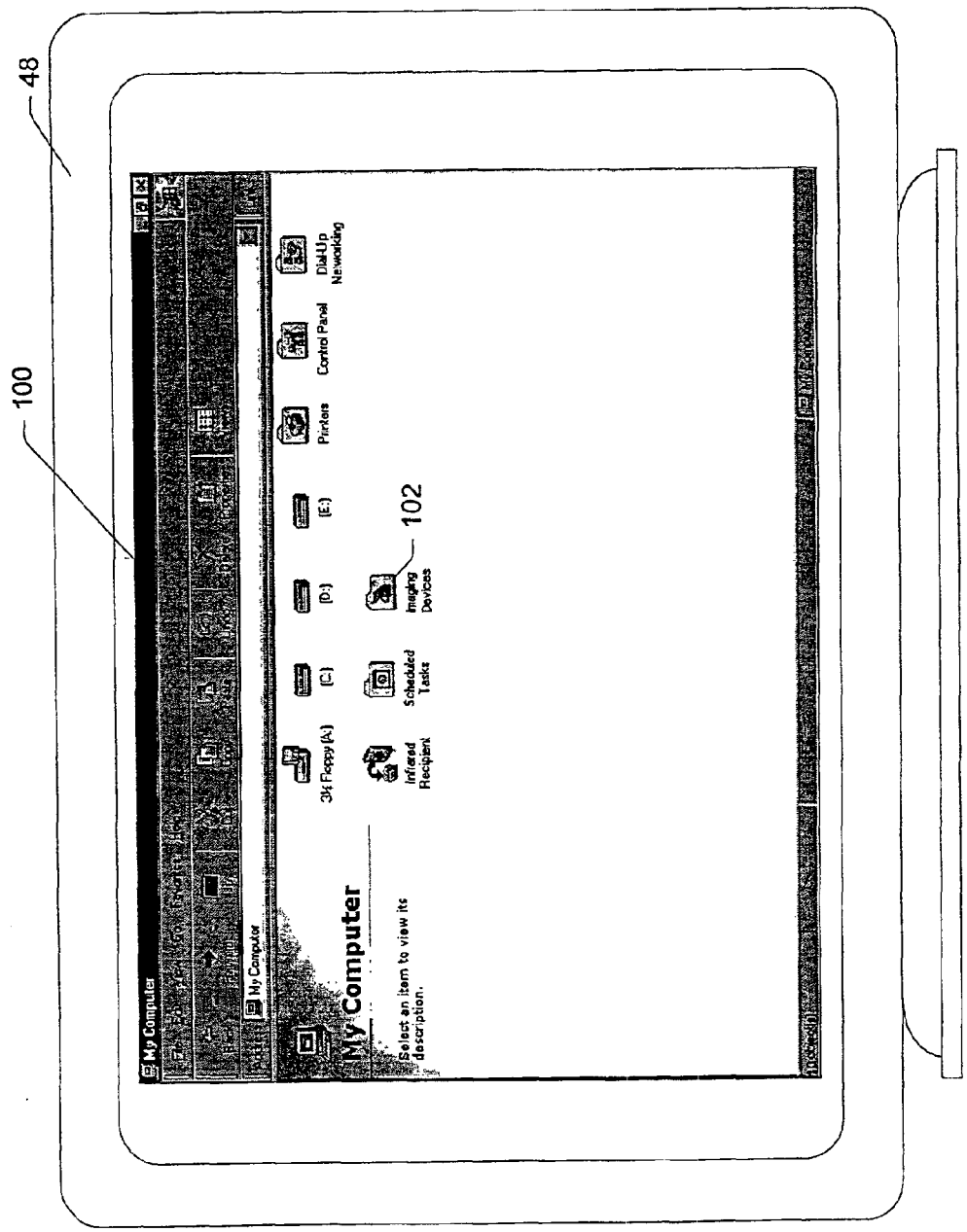
FIG. 3 is a diagrammatic illustration of a graphical user interface window showing integration of the image acquisition system within a familiar file system setting.

FIG. 3 shows an initial graphical user interface window 100 presented on the computer display 48. This window 100 is illustrated as the familiar "My Computer" screen within a browser-based windowing setting, which is well known to users of Windows®-brand operating systems. The "My Computer" window 100 presents a context for listing the major components that make up the user's PC, including disk drives, printers, a control panel, and networking functionality.

Of interest to the image acquisition system is the integration and treatment of the imaging devices as a folder 102 organized with the other general computer components. This provides a convenient starting point for the user to access the imaging devices 24–30 that are coupled to the computer 22.

When the user activates the "Imaging Devices" folder icon 102 for the first time, an installation Wizard comes up to guide the user through the installation of an imaging device. Suppose, for example, the user has installed two scanning devices and a digital camera. Activating the "Imaging Devices" icon 102 navigates to a new "Imaging Devices" window.

Figure 4:
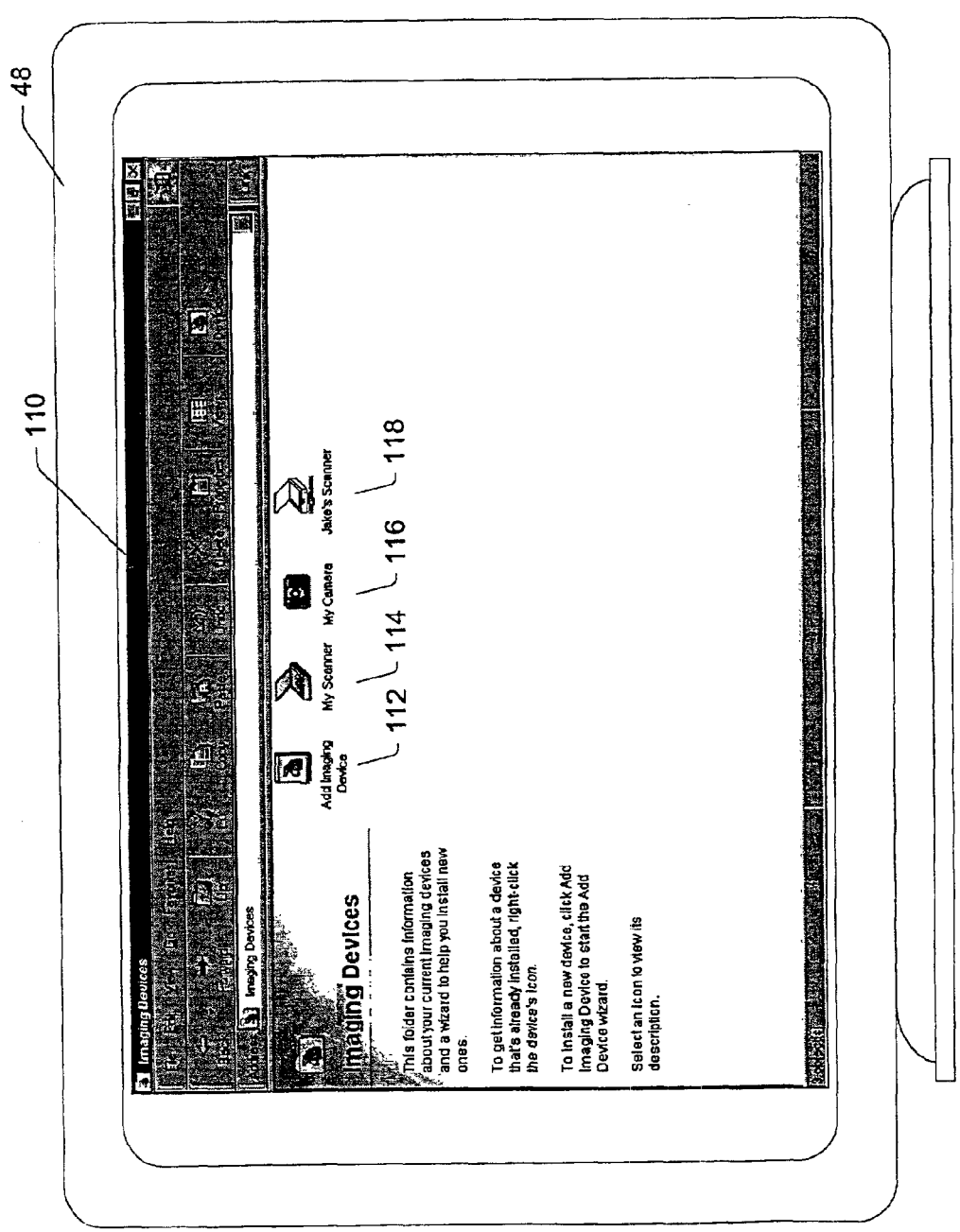
FIG. 4 is a diagrammatic illustration of a graphical user interface window showing an opening window for managing imaging devices.

FIG. 4 shows the "Imaging Devices" window 110 presented on the computer display 48. The "Imaging Devices" window 110 pertains to an imaging context and lists the imaging devices that have been installed on the computer. In this example, the window lists an "add imaging device" icon 112 and icons for the three installed devices: a "My Scanner" icon 114 for a locally installed scanner, a "My Camera" icon 116 for the installed camera, and a "Jake's Scanner" icon 118 for remotely installed (via a network connection) scanner. Activation of the "add imaging device" icon 112 recalls the installation Wizard to enable the user to install any additional imaging devices.

The "Imaging Devices" window 110 distinguishes between devices that are currently available and those that are not available (e.g., offline, physically removed, etc.). Devices that are not available are dimmed and the user has the option of uninstalling them. In FIG. 4, the second scanner identified as "Jake's Scanner" is not available and hence the icon 118 is dimmed.

Activating one of the imaging devices listed in window 110 causes the image acquisition system to present different windows exhibiting contexts that are specific to the selected imaging device. Within these device-oriented windows, the image, acquisition system presents context-specific menus that contain items or a options pertinent and relevant to the particular imaging device.

Figure 5:
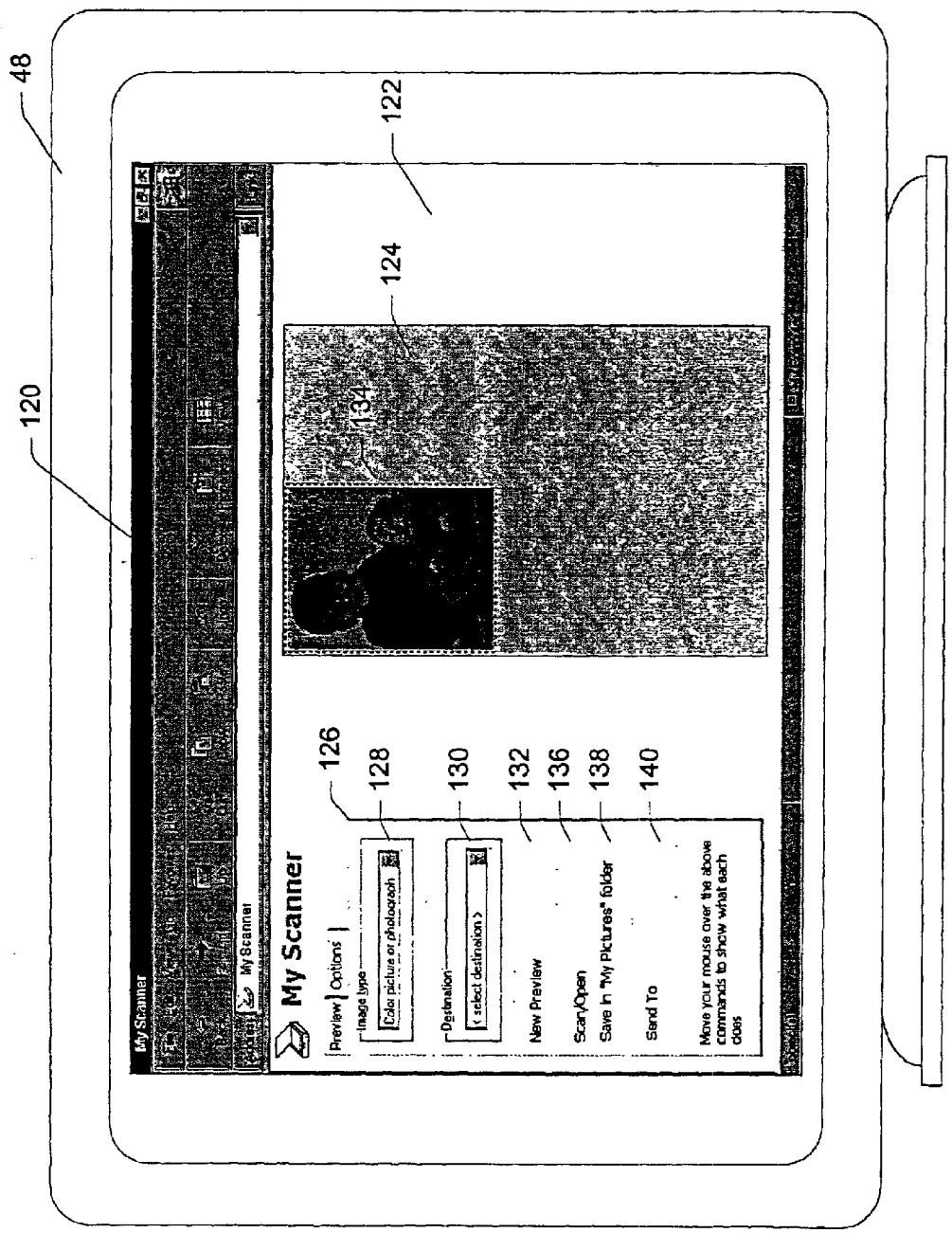
FIG. 5 is a diagrammatic illustration of a graphical user interface window for interfacing with a scanner.

FIG. 5 shows a "My Scanner" window 120 that is presented upon selection of the "My Scanner" icon 114 in FIG. 4. The scanner window 120 presents a context space 122 that pertains to the scanning context. The context space 122 has a preview scan space 124 and a persistently-visible, context-specific menu 126 positioned adjacent the preview scan space within the graphical window 120.

The context-specific menu 126 is always visible in the scanner window 120. The menu 126 offers options that are tailored to operating the scanner attached to the computer or remotely coupled to the computer via a network. While some of the options may be included in a context menu (i.e., a menu that appears near the pointer following a right mouse click), the persistently-visible menu 126 lists operating specific options tailored to the scanner that are not included elsewhere in the user interface.

The menu 126 includes an image type selection 128 that has a pull-down list of various image types from which a user may select. A non-exhaustive list of image types includes color photograph, black and white photograph, color line art, black and white line art, and text. The image types included in the pull-down list 128 are specific to the device. Some imaging devices may not provide support for a given format and hence the format is omitted in that particular list.

A destination selection 130 has a pull-down list of various choices on what to do with the scanned image. For instance, the list 130 might include using the image in an application, faxing the image, printing the image, copying the image to a clipboard, and saving the image in a file. The destination selection simplifies the output operation for the user. For example, selection of a choice directly affects the acquisition parameters and image quality without requiring the user to know what parameters to set.

The persistently-visible context-specific menu 126 also has a "New Preview" command 132 that directs scanners to create a preview image of an image that is currently in the scanning bed. The image is presented in the preview scan space 124. When the image appears in the scan space 124, a preview control 134 is provided to allow the user to select a region of the image for a final scan. In the illustrated implementation, the control 134 is shown as a dashed rectangular box framing the picture. The user can manipulate the box 134 to capture all or less than all of the image. Upon selection of the region, the control can proportionally resize the image to reflect the size of the scanner bed and automatically configure the scanner to make the appropriate adjustments to capture the selected image portion.

The menu 126 includes a "Scan/Open" command 136 to direct the scanner to capture the image. When this command is selected, the scanner scans the image in its bed. Concurrently with this scanning action, the image progressively appears in the preview scan space 124 to visually convey that the scanner is scanning the image. In one implementation, the image is progressively displayed row-by-row from top to bottom of the image.

The menu 126 includes a "Save" option 138, which directs the scanner to capture the image as a file and store the file in the computer memory. The last listed option is a "Send to" option 140, which allows the user to send thee image to various locations (or applications) on the PC, such as for packaging in a facsimile or email.

Figure 6:
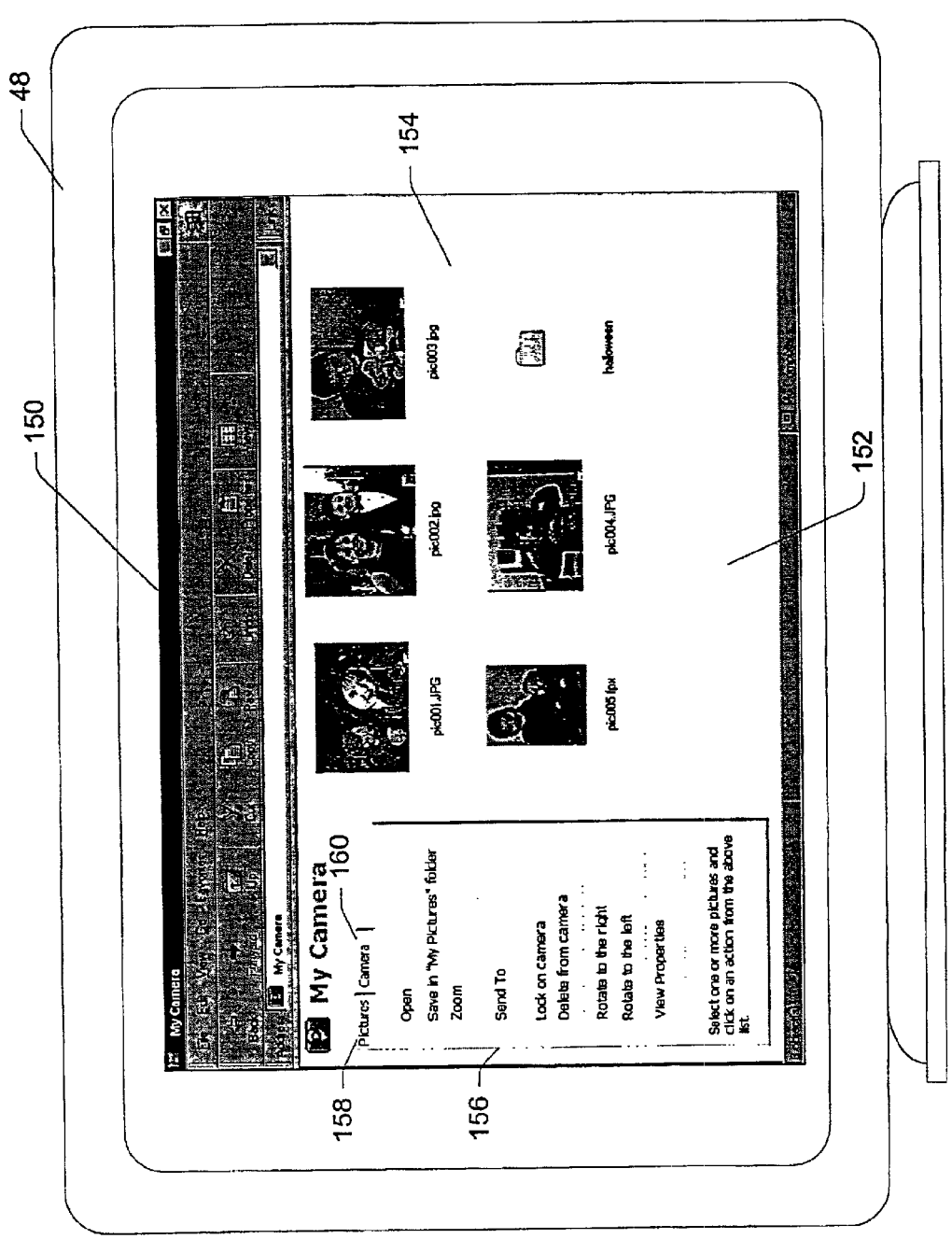
FIG. 6 is a diagrammatic illustration of a graphical user interface window for interfacing with a digital camera.

FIG. 6 shows a "My Camera" window 150 that is presented upon selection of the "My Camera" icon 116 in FIG. 4. The camera window 150 presents a context space 152 that pertains to the camera context. The context space 152 has a file space 154 and a persistently-visible, context-specific menu 156 positioned adjacent the file space within the graphical window 150.

The context-specific menu 156 is always visible in the camera window 150 and offers options that are tailored to operating the digital camera 28 attached to the computer. While some of the options may be included in a context menu (i.e., a menu that appears near the pointer following a right mouse click), the persistently-visible menu 156 lists operating specific options tailored to the camera that are not included elsewhere in the user interface.

The menu 156 is illustrated as having two tabs: a pictures tab 158 and a camera tab 160. Table 1 contains the options and corresponding functions available on the pictures tab 158.

TABLE 1

| Option | Function |
| --- | --- |
| Open | Opens a picture with a default registered application. |
| Save in "My Pictures" folder | Downloads the images from the camera and copies them to "My Pictures" directory on computer memory. |
| Zoom | Changes the window view and allows the user to select one picture at a time and zoom in/out of the picture once it is copied locally. |
| Send to | Allows the user to send the picture to various locations (or applications) on the PC. For example, the user may choose to "send" the picture to an "email recipient". |
| Lock on Camera | Allows the user to lock a picture to prevent accidental deletion. |
| Delete from Camera | Allows the user to permanently remove the picture from the camera after a confirmation. |
| Rotate to the Right | Allows the user to rotate the picture 90 degrees to the right. |
| Rotate to the Left | Allows the user to rotate the picture 90 degrees to the left. |
| View Properties | Allows the user to view properties associated with the selected picture(s). |

Table 2 contains the options and corresponding functions available on the camera tab 160.

TABLE 2

| Option | Function |
| --- | --- |
| Take Picture | Triggers the camera to take a picture. |
| Copy all Pictures | Copies all the pictures to designated location on the PC. |
| Remove all Pictures | Deletes all pictures in the camera. |
| Share | Brings up a wizard for the local user to share the camera. |

TABLE 2-continued

| Option | Function |
| --- | --- |
| Initialize Memory Card | Enables user to initialize the storage card in the camera. |
| View Properties | Allows the user to view a summary of the camera properties. |

The file space 154 lists files and/or folders that pertain to digital images taken by the digital camera. The files are the images themselves (e.g., JPG files) and the folders contain image files and/or other folders with image files in them.

The file space 154 presents the files that are currently stored on the camera. In this manner, the user can easily view the camera memory as if it were another memory of the computer. The UI allows easy integration of the camera control into the familiar windowing environment.

To add a picture to the file space, the user captures a picture using the "Take Picture" command in the camera menu 160. The picture then appears as a file in the file space 154. The user can then select the image file by clicking on the file and manipulating the picture using the commands on the pictures menu 158, such as "Rotate to the Left", "Rotate to the Right", "Zoom", and "Send to". The user can also save the image file to the computer memory using the command "Save in My Pictures folder".

Figure 7:
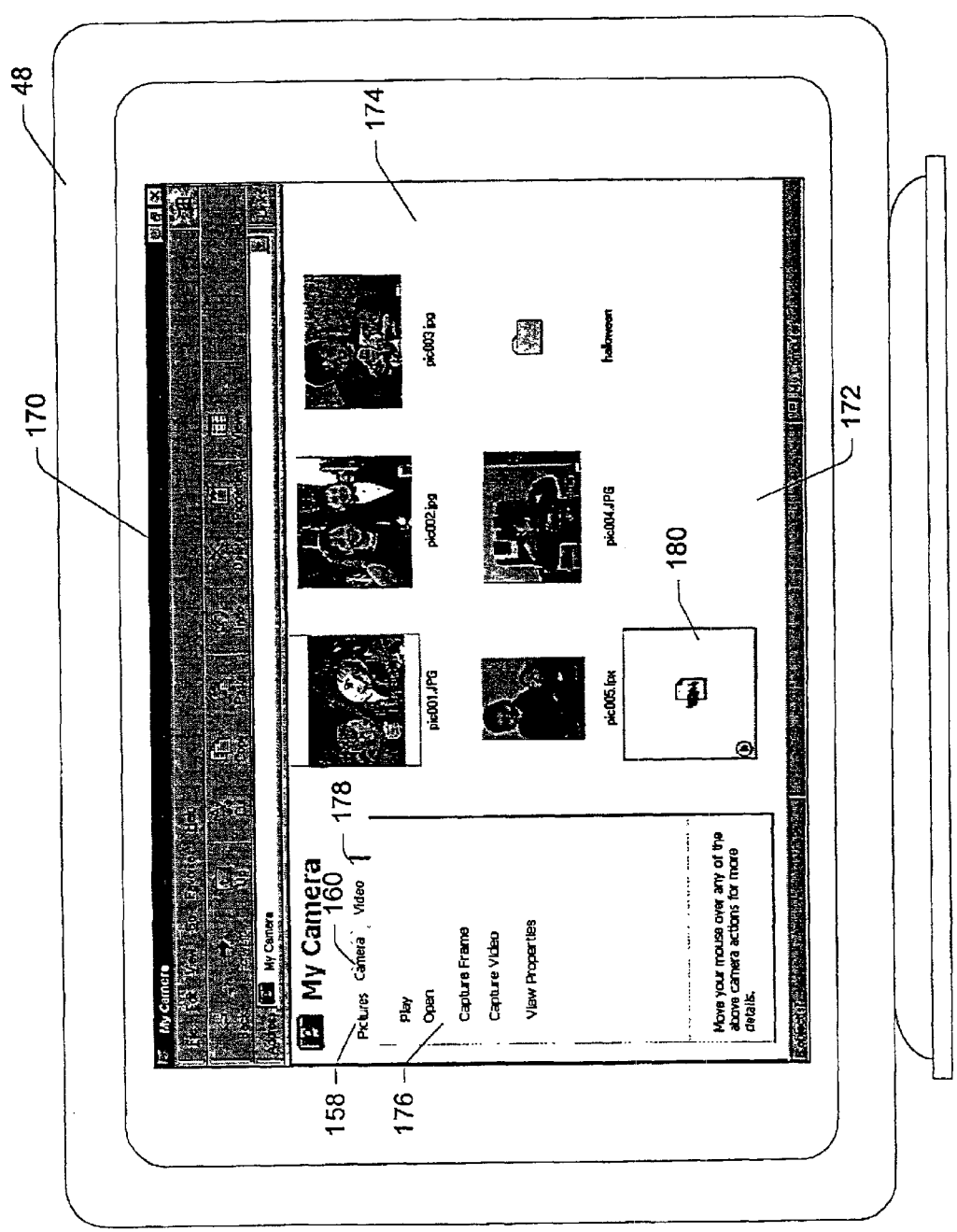
FIG. 7 is a diagrammatic illustration of a graphical user interface window for interfacing with a digital video camera.

FIG. 7 shows a modified "My Camera" window 170 that supports dual-mode cameras (i.e., video and still). The modified window 170 is presented upon selection of the "My Camera" icon 116 in FIG. 4 and is similar to the window 150 of FIG. 6 in that it has a context space 172 with a file space 174 and a persistently-visible, context-specific menu 176. However, in this modified implementation, the context-specific menu 176 also has a video tab 178 to list options pertaining to operation of the video camera 26.

Notice also that one of the files in the file space 174 is a play-in-place video file 180. This play-in-place video file 180 can be actuated to play a video clip or stream within the small area depicted as box 180. That is, the static video icon in box 180 is replaced with a streaming video at the same location in the file space. Play-in-place video files 180 were first introduced in Media Manager, a multimedia application available from Microsoft Table 3 contains the options and corresponding functions available on the video tab 178.

TABLE 3

| Option | Function |
| --- | --- |
| Play | Plays back a video stream from the video camera. |
| Open | Opens a video file with a default application. |
| Capture Frame | Directs the video camera to record a single still-image frame. |
| Capture Video | Directs the video camera to record a video clip. |
| View Properties | Allows the user to view a summary of the video camera properties. |

Other commands may be added to the menu. For instance, a "stop" command may be employed to halt the capture of live video.

Image Acquisition API

The image acquisition API 66 enables applications to manage loading and unloading of all imaging devices, monitor device events, query device information properties, create device objects, capture images using the devices, and store or manipulate the images after their capture.

The interfaces are accessible by high level languages (e.g., Visual Basic) as well as lower level ones (e.g., C, C++, etc.). COM is a suitable interface. In this context, each device is exposed as a COM object, whereby the object provides a number of methods and properties associated with the imaging device.

As one exemplary implementation, there are three general objects: a device manager object, a camera object, and a scanner object. The objects are described generally below. A more detailed description of the objects and methods are provided at the end of this section.

The device object contains device context and status information for a physical device. Once a device object is created for a physical device, the physical device controls what device properties are available and what values the properties may assume. There may be multiple device objects created for any physical device. However, a device object has exclusive access to a physical device before any operation (i.e., scan, take a picture, etc.) is performed. Exclusive access to a physical device is made available through a locking/unlocking mechanism.

The device manager is implemented as three objects that perform the following functions:

A CImageInDevMgr object is used to:
  Create a device enumerator object
  Create a device object when given a DeviceID
  Display UI to let a user choose a device object
  Display UI to both choose a device and acquire an image from the chosen device.
A CEnumImageInDevInfo object is used to:
  Enumerate all ImageIn devices on a system. For each device enumerated, a CImageInDevInfo object is returned.
A CImageInDevInfo object is used to:
  Query device information properties from the ImageIn device. One of the properties, Device ID, can be used by CImageInDevMgr to create a device object.

The camera object may expose the following functions:
  Open and close the device for communication
  Control the device
  Update and read device properties
  Update and read picture properties
  Download, remove, and upload pictures to device The scanner object may expose the following functions:
  Open and close the device for communication
  Control the device
  Update and read device properties
  Set operation intent ImageIn Device Manager The ImageIn device manager provides interfaces for enumerating devices, querying properties of installed ImageIn devices and creating ImageIn device objects. The device manager has three objects.

CImageInDevMgr is used to:
  Create an enumerator object, CEnumImageInDevInfo
  Create a device object when given a DeviceID.
  Display UI to let a user choose a device object.
  Display UI to both choose a device and acquire an image from the chosen device.
CEnumImageInDevInfo is used to:
  Enumerate all ImageIn devices on a system. For each device enumerated, a CImageInDevInfo object is returned.

CImageInDevInfo is used to:
 Query device information properties from the ImageIn device. One of the properties, Device ID, can be used by CImageInDevMgr to create a device object.

Device information properties are distinct from normal device properties in that they are read from the registry and can be queried without forcing the device object to be created.

A program using its own methods to select an ImageIn device would do the following:
 Create a CImageInDevMgr object
 Use the IImageInDevMgr interface to create a CEnumImageInDevInfo object
 Use IEnumIMAGEIN_DEV_INFO interface to create a CImageInDevInfo object for each ImageIn device enumerated.
 Use IPropertyStorage interface of CImageInDevInfo object to inspect the device information properties of each device, save the Device ID property from the desired device.
 Use the DeviceID property in IImageInDevMgr interface to create an ImageIn device object.

IImageInDevMgr Interface
EnumImageInDevInfo

```
HRESULT IImageInDevMgr::EnumImageInDevInfo(
        LONG                    lFlags,
        IEnumIMAGEIN_DEV_INFO** ppIEnum);
```

EnumImageInDevInfo creates a standard enumerator for CImageInDevInfo objects. The enumerator itself is a CEnumImageInDevInfo object that has a single interface IEnumIMAGEIN_DEV_INFO. Applications can use this API to obtain device information properties from available ImageIn devices.

Parameters:
lFlags    Specifies the type of device to enumerate.
ppIEnum   Enumeration interface for cEnumImageInDevInfo objects.

GetImageInDevInfo

```
HRESULT IImageInDevMgr::GetImageInDevInfo(
        BSTR               bstrDeviceID,
        IPropertyStorage** ppIPropStg);
```

Given a device ID GetImageInDevInfo returns an IPropertyStorage interface to CImageInDevInfo objects. This API gives applications a quick way to retrieve device information properties from a stored device ID.

Parameters:
bstrDeviceID, Device ID string returned from device info object.
ppIPropStg IPropertyStorage interface to CImageInDevInfo objects.

CreateImageInDev

```
HRESULT IImageInDevMgr::CreateImageInDev(
        BSTR       bstrDeviceID,
        IUnknown** ppDevice);
```

CreateImageInDev creates a device object identified by bstrDeviceID and returns an IUnknown interface to the object. The application can use QueryInterface on this IUnknown to access the other interfaces on a device.

Parameters:
bstrDeviceID  Device ID string returned from device info object.
ppDevice      IUnknown interface pointer returned.

SelectImageInDev

```
HRESULT IImageInDevMgr::SelectImageInDev(
        LONG       lFlags,
        IUnknown** ppDevice);
```

SelectImageInDev displays UI for the selection of ImageIn devices. When the user selects a device, the device object is created and an IUnknown interface is returned. The application can then use QueryInterface on this IUnknown to access the other interfaces on a device. Returns S_FALSE if the user cancels the selection dialog without making a device selection, S_OK if the user makes a device selection or an error value if the method fails.

Parameters:
lFlags    Operation flags
ppDevice  IUnknown interface pointer returned GetImage

```
HRESULT IImageInDevMgr::GetImage(
        LONG       lFlags,
        LONG       lIntent,
        LONG       cfFormat,
        STGMEDIUM* pMedium);
```

GetImage displays device selection UI allowing a user to select a device. If the user selects a device, a device is created and device UI is displayed to capture the image. Image data is returned in the pMedium structure. Image format and default image capture properties may be specified using the Intent and cfFormat parameters. Returns S_FALSE if the user cancels the selection dialog without to making a device selection, S_OK if the user makes a device selection and the data is transferred or an error value if the method fails.

Parameters:

| | |
|---|---|
| lFlags | Operation flags |
| lIntent | Intent, default image capture properties |
| cfFormat | Clipboard format desked by application |
| pMedium | Image is returned through this medium. |

EnumDestinationInfo

```
HRESULT IImageInDevMgr::EnumDestinationInfo(
        LONG                      lFlags,
        IUnknown*                 pDevice,
        IEnumIMAGEIN_DEST_INFO**  ppIEnum);
```

EnumImageInDestInfo creates a standard enumerator for CImageInDestInfo objects. The enumerator itself is a CEnumImageInDestInfo object that has a single interface IEnumIMAGEIN_DEST_INFO. Applications can use this API to obtain device destination properties from an ImageIn device. Destination applications are registered using RegisterDestinationApplication.

Parameters:

| | |
|---|---|
| lFlags | Enumeration flags. |
| pDevice | Device object. If null destination applications for all devices are enumerated. |
| ppIEnum | Enumeration interface for CEnumImageInDestInfo objects. |

RegisterDestinationApplication

```
HRESULT IImageInDevMgr::RegisterDestinationApplication(
        LONG       lFlags,
        LONG       lIntent,
        IUnknown*  pDevice,
        BSTR       bstrEvent,
        BSTR       bstrAppName,
        BSTR       bstrCommandLine);
```

This method is called when an application wishes to register as an ImageIn destination.

Parameters:

| | |
|---|---|
| lFlags | Registration flags. |
| lIntent | Intent, default image capture properties. |
| pDevice | Device object. If null, destination application is registered for all devices. |
| bstrEvent | Optional event name. |
| bstrAppName | Friendly name of Application. This name will be displayed to the user in UI. |
| bstrCommandLine | Full path to the executable for this application. Additional command line arguments may be added to this command. |

UnregisterDestinationApplication

```
HRESTUL IImageInDevMgr::UnregisterDestinationApplication
        LONG       lFlags,
        IUnknown*  pDevice,
        BSTR       bstrAppName);
```

This method is called when an application that has registered an ImageIn destination wishes to be uninstalled or no longer known as an ImageIn destination Parameters:

| | |
|---|---|
| lFlags | Operation flags. |
| pDevice | Device object. If null, destination application is unregistered for all devices. |
| bstrAppName | Friendly name of Application, used to register application. |

IEnumIMAGEIN_DEV_INFO Interface

The IEnumIMAGEIN_DEV_INFO interface is a standard OLE enumeration interface that supports per device enumeration of device information properties.

Next

```
HRESULT IEnumIMAGEIN_DEV_INFO::Next(
        ULONG             celt,
        IPropertyStorage** rgelt,
        ULONG             *pceltFetched);
```

Next returns an array of IPropertyStorage interfaces to CImageInDevInfo objects. Applications can use the returned of IPropertyStorage interfaces to obtain device information properties from available ImageIn devices.

Parameters:

| | |
|---|---|
| celt | Specifies the number of elements requested. |
| rgelt | Address of an array in which to return the IPropertyStorage interfaces. |
| pceltFetched | Address of a value that receives a count of the item identifiers actually returned in rgelt. |

Skip
HRESULT IEnumIMAGEIN_DEV_INFO::Skip (ULONG celt);
Skip skips device objects in the enumeration.
Parameters:
celt Number of items to skip.
Reset
HRESULT IEnumIMAGEIN_DEV_INFO::Reset (void);
Reset sets the enumeration back to the first device.
Clone
HRESULT IEnumIMAGEIN_DEV_INFO::Clone (IEnumIMAGEIN_DEV_INFO **ppIEnum);
Clone creates another IEnumIMAGEIN_DEV_INFO enumeration object and returns an interface pointer to it.
Parameters:
ppIEnum Address that receives a pointer to the new enumeration object.
IEnumIMAGEIN_DEST_INFO Interface The IEnumIMAGEIN_DEST_INFO interface is a standard OLE enumeration interface that supports enumeration of device destination properties.

Next

```
HRESULT IEnumIMAGEIN_DEST_INFO::Next(
        ULONG              celt,
        IPropertyStorage** rgelt,
        ULONG              *pceltFetched);
```

Next returns an array of IPropertyStorage interfaces to CImageInDestInfo objects. Applications can use the returned of IPropertyStorage interfaces to obtain destination information properties from available ImageIn devices.

Parameters:

celt Specifies the number of elements requested.

rgelt Address of an array in which to return the IPropertyStorage interfaces.

pceltFetched Address of a value that receives a count of the item identifiers actually returned in rgelt.

Skip

HRESULT IEnumIMAGEIN_DEST_INFO::Skip (ULONG celt);

Skip skips destination objects in the enumeration.

Parameters:

celt Number of items to skip.

Reset

HRESULT IEnumIMAGEIN_DEST_INFO::Reset (void);

Reset sets the enumeration back to the first device.

Clone

HRESULT IEnumIMAGEIN_DEST_INFO::Clone (IEnumIMAGEIN_DEST_INFO **ppIEnum);

Clone creates another IEnumIMAGEIN_DEST_INFO enumeration object and returns an interface pointer to it.

Parameters:

ppIEnum Address that receives a pointer to the new enumeration object.

IPropertyStorage Interface

The IPropertyStorage interface is used to query the device information and destination properties. IPropertyStorage is a standard OLE interface and is documented in the OLE Programmers Reference. All device information properties are read only. Any attempt to modify the device information properties will result in a failure with access denied. The methods of this interface are:

HRESULT ReadMultiple(ULONG, const PROPSPEC, PROPVARIANT)

HRESULT WriteMultiple(ULONG, const PROPSPEC, PROPVARIANT, PROPID);

HRESULT DeleteMultiple(ULONG, const PROPSPEC);

HRESULT ReadPropertyNames(ULONG, const PROPID, LPOLESTR);

HRESULT WritePropertyNames(ULONG, const PROPID, LPOLESTR);

HRESULT DeletePropertyNames(ULONG, const PROPID);

HRESULT Commit(DWORD);

HRESULT Revert(void);

HRESULT Enum(IEnumSTATPROPSTG**);

HRESULT SetTimes(FILETIME const *, FILETIME const *, FILETIME const *);

HRESULT SetClass(REFCLSID);

HRESULT Stat(STATPROPSETSTG *);

Device Information Properties

All ImageIn devices support the following basic device information properties:

Device CLSID—The CLSID of the ImageIn server for this device.

Unique Device ID—A device ID which is unique per physical device.

Vendor Description—The device manufactures name.

Device Description—A description of the device.

Device Type—A device type constant: scanner, camera . . .

Device Port Name—Name of the port through which the device is connected.

Device Friendly Name —A user readable device name.

Device Icon Resource—Resource file name and ID.

Device Bitmap Resource—Resource file name and ID.

Server Name—The name of the server where the ImageIn server for this device is running.

Image Scanner Device Object

ImageIn device objects support interfaces for querying and setting device properties, displaying device UI and transferring data. ImageIn devices are required to support a small number of standard interfaces that allow applications to deal with all devices in a common manner and transfer data from the devices in a manner that is native to the (COM) application. Device objects may also support more specialized interfaces to implement custom functions. Since the application has a direct connection to the device object, this architecture does not place any strict limits on the interfaces a device object can export. Practically speaking though, applications must know about an interface for it to be useful.

IScan Interface

ScanDlg

```
HRESULT ScanDlg(
        LONG    lFlags,
        LONG    lIntent);
```

ScanDlg presents the system or device UI needed to prepare a device for scanning. If the dialog successfully completes, the scan object will be ready to begin data transfer via the IDataObject or IimageTransfer interfaces. The default image capture properties may be specified using the optional lIntent parameter. Returns S_FALSE if the user cancels the selection dialog without making a device selection, S_OK if the user makes a device selection or an error value if the method fails.

| Parameters: | |
| --- | --- |
| lFlags | Operation flags |
| lIntent | Intent, default image capture properties |

IPropertyStorage Interface

The standard IPropertyStorage interface is used to query and set all scan device properties. IPropertyStorage is a standard OLE interface and is documented in the OLE Programmers Reference. The methods of this interface are:

HRESULT ReadMultiple(ULONG, const PROPSPEC, PROPVARIANT);

HRESULT WriteMultiple(ULONG, const PROPSPEC, PROPVARIANT, PROPID);

HRESULT DeleteMultiple(ULONG, const PROPSPEC);

HRESULT ReadPropertyNames(ULONG, const PROPID, LPOLESTR);

HRESULT WritePropertyNames(ULONG, const PROPID, LPOLESTR);

HRESULT DeletePropertyNames(ULONG, const PROPID);

HRESULT Commit(DWORD);

HRESULT Revert(void);

HRESULT Enum(IEnumSTATPROPSTG**);

HRESULT SetTimes(FILETIME const *, FILETIME const *, FILETIME const *);

HRESULT SetClass(REFCLSID);

HRESULT Stat(STATPROPSETSTG *);

All ImageIn scanner devices support the following basic device properties:

Horizontal Resolution—The horizontal resolution in DPI.

Vertical Resolution—The vertical resolution in DPI.

Horizontal Scan Start Position—The horizontal start position in pixels.

Vertical Scan Start Position—The vertical start position in pixels.

Horizontal Scan Extent—The width of the scan in pixels.

Vertical Scan Extent—The height of the scan in pixels.

Scan Data Type—A data format specification constant.

Scan Color Depth—The number of bits per pixel used to specify color.

ImageIn scan devices may support additional device properties depending on hardware configuration.

IDevPropStream Interface

The IDevPropStream interface is used to query/set all current device properties from/to a named, non-volatile, registry based storage. The methods of this interface are:

ReadDevPropStream

HRESULT ReadDevPropStream(BSTR bstrName);

ReadDevPropStream reads a device property stream from the specified value and initializes the device with these properties. The properties are per user and per device.

Parameters:

bstrName Name of the property stream.

WriteDevPropStream

HRESULT WriteDevPropStream(BSTR bstrName);

WriteDevPropStream writes the current device property stream to the specified value. The properties are per user and per device.

Parameters:

bstrName Name of the property stream.

ListDevPropStreams

HRESULT ListDevPropStreams(BSTR *pbstrName);

ListDevPropStreams lists the device property stream names present in non-volatile storage. The list is returned in an allocated BSTR which the application must free using SysFreeString.

Parameters:

pbstrName Pointer to receive a list property streams.

DeleteDevPropStream

HRESULT DeleteDevPropStream(BSTR bstrName);

DeleteDevPropStream deletes a device property stream from non-volatile storage.

Parameters:

bstrName Name of the property stream.

IDataObject Interface

The IDataObject interface is a standard OLE data transfer mechanism. This interface is used to provide an easy and natural way for applications to transfer data from a scan device. The full IDataObject interface description can be found in the OLE2 Programmer's Reference. The methods of this interface are:

HRESULT GetData(LPFORMATETC, LPSTGMEDIUM);

HRESULT GetDataHere(LPFORMATETC, LPSTGMEDIUM);

HRESULT QueryGetData(LPFORMATETC);

HRESULT GetCanonicalFormatEtc(LPFORMATETC, LPFORMATETC);

HRESULT SetData (LPFORMATETC, STGMEDIUM FAR *, BOOL);

HRESULT EnumFormatEtc(DWORD, LPENUMFORMATETC FAR *);

HRESULT DAdvise(FORMATETC FAR *, DWORD, LPADVISESINK, DWORD FAR*);

HRESULT DUnadvise(DWORD);

HRESULT EnumDAdvise(LPENUMSTATDATA FAR *)

IImageTransfer Interface

The IImageTransfer is a high performance data transfer interface. This interface uses a shared memory window to transfer data from the device object to the application, eliminating unnecessary data copies during marshalling. For Simplicity, this interface uses the same format negotiation method as IDataObject. IImageTransfer uses two different mechanisms to transfer data.

Banded Transfers

The device breaks a large image transfer up into smaller transfers, which are performed sequentially into an application-specified buffer.

Data Callback

The device does a single large transfer, while calling back to the application as the transfer progresses.

itAllocateTransferBuffer

| HRESULT itAllocateTransferBuffer( | |
| --- | --- |
| LONG | lFlags, |
| LONG | lSize, |
| ULONG | hSection, |
| ULONG | ProcessID); |

Allocates a buffer to use for scanning data from the device. The buffer is mapped into the address space of both the client and server process.

| Parameters: | |
| --- | --- |
| lFlags | Operation flags. |
| lSize | Size in bytes of the requested buffer. |
| hSection | Mapped section handle |
| ProcessID | Caller process ID | itFreeTransferBuffer

HRESULT itFreeTransferBuffer(void);

Free the buffer created by itAllocateTransferBuffer. This buffer is also freed when the device object is destroyed.

itBeginTransfer

```
HRESULT itBeginTransfer(
        LPFORMATETC    pFormatEtc,
        LONG           lFlags,
        IDataCallback* pIDataCallback);
```

Reset a device object context to begin an IImageTransfer.

Parameters:

| | |
|---|---|
| pFormatEtc | Format specification. |
| lFlags | Operation flags. |
| pIDataCallback | Optional transfer progress notification entry point. |

ItGetImage

```
HRESULT itGetImage(
        LONG    lFlags,
        LONG*   plSrcOffset,
        LONG*   pcbWritten);
```

Perform an image transfer.

Parameters:

| | |
|---|---|
| lFlags | Operation flags. |
| plSrcOffset | Source pointer for transfer. |
| pcbWritten | Actual number of bytes written during transfer. | itGetImageCB

HRESULT itGetImageCB(LONG lFlags);

Perform an image transfer using a user specified callback.

Parameters:

lFlags Operation flags.

itEndTransfer

HRESULT itEndTransfer(LONG lFlags);

Cleanup a device object context after an image transfer

Parameters:

lFlags Operation flags.

itQueryGetData

HRESULT itQueryGetData (LPFORMATETC pfe);

Check to see if a device supports a given format in an image transfer.

Parameters:

pfe Pointer to the FORMATETC structure defining the format, medium, and target device to use for the query.

itEnumFormatEtc

```
HRESULT itEnumFormatEtc(
        DWORD             dw,
        LPENUMFORMATETC*  lpEnum);
```

Create a format enumerator.

Parameters:

| | |
|---|---|
| dw | Reserved |
| lpEnum | Indirect pointer to the IEnumFORMATETC interface on the new enumerator object. |

ImageIn Camera Device Object

The ImageIn Camera is a hierarchical object. The top-level camera object is used to get basic device information and also to get access to individual images or image folders. The CCameraItem object represents images and Image folders.

ICamera Interface

TakePicture

HRESULT TakePicture ( );

The TakePicture method instructs a camera to take a new picture.

GetCameraRootItem

HRESULT GetCameraRootItem(ICameraItem** pICameraItem);

This method returns an interface to the root CCameraItem object. Using the IcameraItem interface it is possible to enumerate all images on the camera.

Parameters:

PICameraItem Interface pointer to root camera item

GetCameraItemByHandle

```
HRESULT GetCameraItemByHandle(
        ULONG         ulItemHandle,
        ICameraItem** pICameraItem);
```

This method returns an ICameraItem interface to the specified CCameraItem object. A handle for a CCameraItem object can only be obtained through the ICameraItem interface.

Parameters:

| | |
|---|---|
| ulItemHandle | Handle to camera item, previously returned by CameraItem interface |
| pICameraItem | Interface pointer to Camera Item specified by handle |

CameraDlg

```
HRESULT CameraDlg(
        LONG          lFlags,
        LONG          lIntent,
        ICameraItem** pICameraItem);
```

Display the camera UI. UI will select an image on a device and prepare for image transfer. The UI returns a ICameraItem interface to a CCameraItem ready for data transfer. IDataObject or IImageTransfer interfaces are then used to transfer image data.

Parameters:

| | |
|---|---|
| lFlags | Operational flags |
| lIntent | High level intent |
| pICameraItem | Interface pointer to Camera Item selected by Dlg |

ICameraItem Interface

A CCameraItem object is created for every image and directory on the camera. This is done to support full and flexible hierarchical image storage on cameras. A ICameraItem pointer is returned for each CCameraItem object. ICameraItem methods are defined below.

GetItemType

HRESULT GetItemType (ULONG *pItemType);

GetItemType returns the type of camera item the object represents. The two types of camera items are:

1. ItemTypeFolder—CCameraItem is a folder that may contain other CCameraItems
2. ItemTypeImage—CcameraItem is an image.

Parameters:

pItemType Item Type returned

GetItemHandle

HRESULT GetItemHandle(ULONG *pItemHandle);

Returns a handle to the CCameraItem. This handle can later be used by the ICamera interface to get an interface pointer back to this object.

Parameters:

PItemHandle Item handle returned. This handle may be used by the GetCameraItemByHandle method of the ICamera interface to obtain an IcameraItem pointer.

OpenImagePropertyStorage

HRESULT OpenImagePropertyStorage (IPropertyStorage** ppIPropertyStorage);

Returns an IPropertyStorage interface to the CCameraItem object.

Parameters:

ppIPropertyStorage Returned IPropertyStorage interface pointer.

EnumChildItems

HRESULT EnumChildItems(IEnumCameraItem** ppIEnumCameraItem);

Creates a CEnumCameraItem object and returns a IEnumCameraItem interface to it. This method only works if the camera item is a folder and the folder is not empty, as shown in the figure above.

Parameters:

ppIEnumCameraItem Pointer to iEnumCameraItem interface.

IEnumCameraItem Interface

IEnumCameraItem is a standard OLE enumerator interface with the usual four methods Next, Skip, Clone and Reset. This enumerator will return an ICameraInterface for each camera item in the current camera folder (that was used in the call to EnumChildItems).

Next

```
HRESULT Next(
    ULONG           celt,
    ICameraItem**   ppICameraItem,
    ULONG*          pceltFetched);
```

Return an ICameraItem interface for each CCameraItem contained by the current folder.

Parameters:

| | |
|---|---|
| celt | number of camera items to get |
| ppICameraItem | List of iCameraItem interface pointers returned. |
| pceltFetched | Number of interface pointers returned |

Skip

HRESULT Skip(ULONG celt);

Skip celt CCameraItem objects.

Parameters:

celt Number of CcameraItem objects to skip

Reset

HRESULT Reset(void);

Begin at the first CCameraItem object.

Parameters: None

Clone

HRESULT Clone(IEnumCameraItem **ppIEnumCameraItem );

Create a new CEnumCameraItem object and return a IEnumCameraItem interface.

Parameters:

ppIEnumCameraItem New enumerator created to exactly match this one.

Camera Download Manager

The camera download manager monitors the connection status of camera devices. When a camera device is connected to the system, the Download Manager will attempt to immediately download all the images from the camera onto the system hard disk. The camera download manager will also maintain a data base of all images previously downloaded from a given camera and not download images that are already cached.

Caching images in this manner has several advantages.

Camera image download can be very slow, this cache prevents any image from needing to be downloaded more than once.

Applications do not need a special API to acquire images from a camera, simply wait for the download to complete and load the image from the file system.

Images are safely and automatically copied to the file system where they can easily be edited, archived, printed or just saved.

In order for the camera download manager to work effectively, camera events must be detectable. For example, it should be easy to detect when a camera is connected or disconnected from the system. This should be detectable without loading the entire camera driver. Also any activity performed directly on the camera (through camera controls) must be reported to software so an accurate internal model of the state of the camera can be kept.

Sample Code

Get an image from an ImageIn device. Use the ImageIn device manager device selection UI and the device image acquisition UI.

```
/***********************************************************
*
*   GetImageFromImageIn
*
*   DESCRIPTION:
*     Use the ImageIn device manager to select a device and acquire an
*     image using the device UI.
*
*   PARAMETERS:
*     pszDIBfileName - Name of the DIB file which contain the
*     image data.
*
***********************************************************/
HRESULT GetImageFromImageIn (LPOLESTR pszDIBfileName)
{
    HRESULT              hr;
    IImageInDevMgr       *pIImageInDevMgr;
    // Get ImageIn device manager object.
    hr = CoCreateInstance  (CLSID_ImageInDevMgr,
                            NULL,
                            CLSCTX_LOCAL_SERVER,
                            IID_IImageInDevMgr,
                            (void**)&pIImageInDevMgr);
    if (SUCCEEDED(hr)) {
        STGMEDIUM StgMedium;
        // Fill in the storage medium spec and get the image.
        StgMedium.tymed = TYMED_FILE;
        StgMedium.lpszFileName = pszDIBfileName;
        StgMedium.pUnkForRelease = NULL;
        hr = pIImageInDevMgr->GetImage   (0,
                                          0,
                                          CF_DIB,
                                          &StgMedium);
        pIImageInDevMgr->Release ( );
    }
    return hr;
}
```

Enumerate all installed ImageIn devices and get the device ID of a specific device:

```
/****************************************************************************
*
*   GetDeviceIDfromDescription
*
*   DESCRIPTION:
*     Get the unique device ID of an ImageIn device based on it's description.
*
*   PARAMETERS:
*     pszDescription  - Requested device description, from device into properties.
*     pszDeviceID     - Buffer for the returned device ID.
*     cbDeviceIDSize  - Size of the returned device ID buffer in bytes.
*
****************************************************************************/
HRESULT GetDeviceIDfromDescription(
        LPOLESTR    pszDescription,
        LPOLESTR    pszDeviceID,
        UINT        cchDeviceID)
{
    HRESULT              hr;
    IImageInDevMgr       *pIImageInDevMgr;
    if  (pszDeviceID && cchDeviceID) {
        *pszDeviceID = '\0';
    }
    else {
        return E_INVALIDARG;
    }
    // Get ImageIn device manager object.
    hr = CoCreateInstance     (CLSID_ImageInDevMgr,
                               NULL,
                               CLSCTX_LOCAL_SERVER,
                               IID_IImageInDevMgr,
                               (void**)&pIImageInDevMgr);
    if  (SUCCEEDED(hr)) {
        IEnumIMAGEIN_DEV_INFO *pIEnumIMAGEIN_DEV_INFO;
        PROPSPEC       PropSpec[1];
        PROPVARIANT    PropVarDesc[1], PropVarID[1];
        UINT           cbSize;
        // Get an enumerator for the ImageIn device information.
        hr = pIImageInDevMgr->EnumImageInDevInfo(0, &pIEnumIMAGEIN_DEV_INFO);
        if  (SUCCEEDED(hr)) {
            IPropertyStorage *pIPropStg;
            ULONG             ul;
            // Enumerate the ImageIn devices, getting a IImageInDevInfo
            // pointer for each. Use this interface to query the registry
            // based properties for each installed device.
            ul = 1;
            while ((hr = pIEnumIMAGEIN_DEV_INFO->Next(1,
                                                      &pIPropStg,
                                                      &ul)) == S_OK) {
                // Read the device description for the current device.
                PropSpec[0] .ulKind = PRSPEC_PROPID;
```

-continued

```
            PropSpec[0].propid = DIP_DEV_DESC;
            hr = pIPropStg->ReadMultiple(1, PropSpec, PropVarDesc);
            if (SUCCEEDED(hr)) {
               // Test for a description match.
               if (!wcscmp(PropVarDesc[0].pwszVal, pszDescription)) {
                  // Read the device ID.
                  PropSpec[0].propid = DIP_DEV_ID;
                  hr = pIPropStg->ReadMultiple(1, PropSpec, PropVarID);
                  if (SUCCEEDED(hr)) {
                     wcsncpy(pszDeviceID, PropVarID[0].pwszVal, cchDeviceID);
                     PropVariantClear(PropVarID);
                  }
               }
               PropVariantClear(PropVarDesc);
            }
            pIPropStg->Release( );
            if (*pszDeviceID) {
               break;
            }
         }
         pIEnumIMAGEIN_DEV_INFO->Release ( );
      }
      pIImageInDevMgr->Release ( );
      if (!*pszDeviceID) {
         hr = E_FAIL;
      }
   }
   return hr;
}
```

Although the invention has been described in language specific to structural features and/or methodological steps, it is to be understood that the invention defined in the appended claims is not necessarily limited to the specific features or steps described. Rather, the specific features and steps are disclosed as preferred forms of implementing the claimed invention.

What is claimed is:

1. For a computer-implemented scanning system having a scanner coupled to a computer, a user interface comprising a graphical window having a preview scan space, the preview scan space being initially empty prior to a time when the scanner scans an image, the user interface progressively displaying the image within the preview scan space to visually convey that the scanner is scanning the image.

2. A user interface as recited in claim 1, wherein the user interface progressively displays the image row-by-row.

3. A user interface as recited in claim 1, wherein the user interface progressively displays the image currently with the scanner scanning the image.

4. A user interface as recited in claim 1, further comprising a persistently-visible menu positioned adjacent the preview scan space within the graphical window, the menu containing options that are particular to operating the scanner.

5. A user interface as recited in claim 1, further comprising a destination list that presents a user with choices on what to do with the scanted image.

6. A user interface as recited in claim 1, further comprising a control to enable a user to select which portion of the image to scan in a final output.

7. A file system embodied on a computer-readable medium incorporating the user interface as recited in claim 1.

8. An operating system embodied on a computer-readable medium incorporating the user interface as recited in claim 1.

9. A browser embodied on a computer-readable medium, incorporating a user interface for a computer-implemented scanning system having a scanner coupled to a computer, the user interface comprising a graphical window having a preview scan space, the preview scan space being initially empty prior to a time when the scanner scans an image, the user interface progressively displaying the image within the preview scan space to visually convey that the scanner is scanning the image.

10. For a computer-implemented scanning system having a scanner coupled to a computer, a computer-implemented method for executing a scanning software application in a graphical user interface windowing environment, comprising the following steps:

presenting a preview scan space within a graphical window, the preview scan space being initially empty; and progressively displaying an image within the preview scan space to visually convey that the scanner is scanning the image.

11. A computer-implemented method as recited in claim 10 wherein the displaying step comprises the step of building the image row-by-row.

12. A computer-implemented method as recited in claim 10 wherein the displaying step comprises the step of building the image simultaneously as the scanner scans the image.

13. A computer implemented method as recited in claim 10 further comprising the following steps:

presenting a persistently-visible menu within the preview scan space within the graphical window; and listing options in the menu that are particular to operating the scanner.

14. For a computer-implemented scanning system having a scanner coupled to a computer, a user interface comprising:

a graphical window including a context space and a menu and toolbar area, the context space being separate from the menu and tool bar area;

a preview scan space within the context space, the preview scan space being initially empty prior to a time when the scanner scans an image, the user interface progressively displaying the image within the preview scan space to visually convey that the scanner is scanning the image; and a persistently-visible, context-specific menu positioned adjacent the preview scan space within the context space.

15. A user interface as recited in claim 14, wherein the user interface progressively displays the image row-by-row.

16. A user interface as recited in claim 14, wherein the user interface progressively displays the image currently with the scanner scanning the image.

17. A user interface as recited in claim 14, wherein the menu contains options that are particular to operating the scanner, and contains a pull-down list of various image types.

18. A user interface as recited in claim 14, the menu further comprising a destination list that presents a user with choices on what to do with the scanned image.

19. A user interface as recited in claim 14, further comprising a control within the context space to enable a user to select which portion of the image to scan in a final output.

20. A file system embodied on a computer-readable medium incorporating the user interface as recited in claim 14.

21. An operating system embodied on a computer-readable medium incorporating the user interface as recited in claim 14.

22. A browser embodied on a computer-readable medium incorporating a user interface for a computer-implemented scanning system having a scanner coupled to a computer, the user interface comprising:

a graphical window including a context space and a menu and toolbar area, the context space being separate from the menu and tool bar area;

a preview scan space within the context space, the preview scan space being initially empty prior to a time when the scanner scans an image, the user interface progressively displaying the image within the preview scan space to visually cove that the scanner is scanning the image; and a persistently-visible, context-specific menu positioned adjacent the preview scan space within the context space.

23. For a computer-implemented scanning system having a scanner coupled to a computer, a computer-implemented method for executing a scanning software application in a graphical user interface windowing environment, comprising:

displaying a graphical window including a user interface with a menu and toolbar area and a context space separate from the menu and tool bar area;

presenting a preview scan space within the context space, the preview scan space being initially empty;

showing a persistently-visible menu adjacent the preview scan space and within the context space; and progressively displaying an image within the preview scan space to visually convey that the scanner is scanning the image.

24. A computer-implemented method as recited in claim 22, wherein progressively displaying comprises building the image row-by-row.

25. A computer-implemented method as recited in claim 23 wherein progressively displaying comprises building the image simultaneously as the scanner scans the image.

26. A computer-implemented method as recited in claim 23 further comprising listing options in the menu that are particular to operating the scanner.

27. For a computer-implemented scanning system having a scanner coupled to a computer, a user interface comprising a graphical window having a preview scan space, the user interface progressively displaying the image within the preview scan space to visually convey that the scanner is scanning the image.

28. A computer-implemented method as recited in claim 27 wherein the preview scan space is initially empty prior to a time when the scanner scans an image.

29. A preview scan user interface embodied on a computer-readable medium and executable on a computer comprising:

a graphical window including a context space, a menu area and toolbar area, the context space being separate from the menu and tool bar areas;

a preview scan space within the context space, the preview scan space being initially empty prior to a time when the scanner scans an image, the user interface progressively displaying the image within the preview scan space to visually convey that the scanner is scanning the image;

the menu area including a persistently-visible, context-specific menu positioned adjacent the preview scan space within the context space and the menu and toolbar areas; and a file space of a selectable context, the file space being separate from the menu and toolbar areas and exhibiting one or more files and/or folders pertaining to the context, the context-specific menu listing options that are particular to the context of the file space so that upon selection of a first context, the file space is populated with one or more files and/or folders pertaining to the first context and the persistently-visible context-specific menu lists options pertaining to doe first context and upon selection of a second context, the file space is populated with one or more files and/or folders pertaining to the second context and the persistently-visible context-specific menu list options pertaining to the second context.

30. The preview scan user interface as recited in claim 29, wherein the user interface progressively displays the image row-by-row.

31. The preview scan user interface as recited in claim 29, wherein the user interface progressively displays the image currently with the scanner scanning the image.

32. The preview scan user interface as recited in claim 29, wherein the menu contains options that am particular to operating the scanner, and contains a pull-down list of various image types.

33. The preview scan user interface as recited in claim 29, the menu her comprising a destination list that presents a user with choices on what to do with the scanned image.

34. The preview scan user interface as recited in claim 29, further comprising a control within the context space to enable a user to select which portion of the image to scan in a final output.

35. A file system embodied on a computer-readable medium incorporating the preview scan user interface as recited in claim 29.

36. An operating system embodied on a computer-readable medium incorporating the preview scan user interface as recited in claim 29.

* * * * *